BURNHAM & PIERCE.
Subsoil-Plow.
No. {2,127, 33,131.}
Patented Aug. 27, 1861.
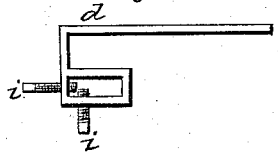
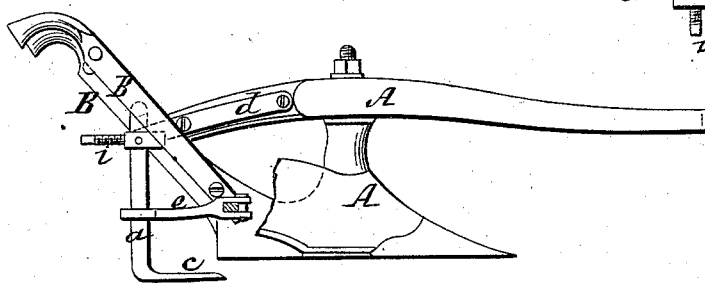
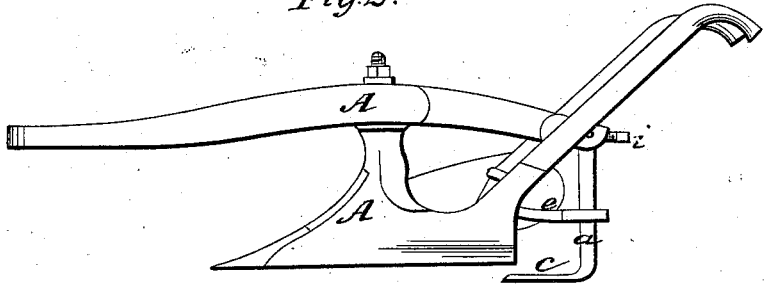
Witnesses:
C. M. Alexander
Arthur A. Yeatman
Inventor:
Wm. H. H. Burnham
L. B. Pierce.

UNITED STATES PATENT OFFICE.

WM. H. H. BURNHAM AND SAML. B. PIERCE, OF HOMER, NEW YORK.

IMPROVEMENT IN SUBSOIL-PLOWS.

Specification forming part of Letters Patent No. 33,131, dated August 27, 1861.

*To all whom it may concern:*

Be it known that we, WM. H. H. BURNHAM and S. B. PIERCE, of Homer, Cortland county, New York, have invented certain new and useful Improvements in Subsoil-Plows; and we do declare that the following is a full, clear, and exact description of the same, reference being had to the accompanying drawing, and to the letters of reference marked thereon.

In the annexed drawing, making part of this specification, A A represent a turning-plow made in any of the known and approved ways.

B B are the handles of said plow.

$d$ and $e$ represent metallic bars with loops in them. The bar $d$ is secured to the rear of the beam, as seen, while the bar $e$ is secured to a cross-piece between the handles at their lower extremities, said piece turning to allow of an adjustability of the bar $e$ when the shank $a$ changes its position so as to require it. $a$ represents a metallic shank with a blade, $c$, secured to its lower end. The shank $a$ passes through the loops of the bars $d$ and $e$, and is secured in place by means of two set-screws, $i\ i$. The blade $c$ is intended to run in the furrow made by the plow A for the purpose of subsoiling. The shank $a$ is made of a length sufficient to run from one to twelve inches below the furrow of the plow. It will readily be seen that this attachment is very economical and will be very effective.

When it is desirable to use the plow without the subsoil attachment, the screws $i\ i$ may be slackened and the shank $a$ may be removed, so that the plow may be used for other purposes.

Having thus fully described our invention, what we claim as new, and desire to secure by Letters Patent, is—

The arrangement of the adjustable bar $e$, secured as set forth, with the shank $a$, blade $c$, bar $d$, set-screws $i\ i$, and plow A, the several parts being constructed and used in the manner and for the purpose specified.

W. H. H. BURNHAM.
    SAML. B. PIERCE.

Witnesses:
 WM. ANDREWS,
 AHNERAN A. BABCOCK.